(12) United States Patent
Konishi et al.

(10) Patent No.: US 10,919,621 B2
(45) Date of Patent: Feb. 16, 2021

(54) UNMANNED AIR VEHICLE (71) Applicant: Panasonic Intellectual Property Corporation of America, Torrance, CA (US)

(72) Inventors: Kazunobu Konishi, Osaka (JP); Stephen John, Nara (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 308 days.

(21) Appl. No.: 16/044,538

(22) Filed: Jul. 25, 2018

(65) Prior Publication Data
US 2019/0039725 A1 Feb. 7, 2019

Related U.S. Application Data

(60) Provisional application No. 62/539,828, filed on Aug. 1, 2017.

(30) Foreign Application Priority Data

Mar. 23, 2018 (JP) .............................. JP2018-057309

(51) Int. Cl.
*B64C 27/00* (2006.01)
*H04R 1/40* (2006.01)
*B64C 27/20* (2006.01)
*B64C 39/02* (2006.01)
(Continued)

(52) U.S. Cl.
CPC ............ *B64C 27/001* (2013.01); *B64C 27/20* (2013.01); *B64C 39/024* (2013.01);
(Continued)

(58) Field of Classification Search
CPC ........ B64C 2027/003; B64C 2201/024; B64C 2220/00; B64C 27/001; B64C 27/20;
(Continued)

(56) References Cited

U.S. PATENT DOCUMENTS

| | | | |
|---|---|---|---|
| 2010/0140415 A1* | 6/2010 | Goossen | B64C 39/024 244/23 A |
| 2011/0217163 A1* | 9/2011 | Camci | F02K 3/077 415/220 |

(Continued)

FOREIGN PATENT DOCUMENTS

JP 2009-057182 3/2009

*Primary Examiner* — Claude J Brown
(74) *Attorney, Agent, or Firm* — Greenblum & Bernstein, P.L.C.

(57) ABSTRACT

An unmanned air vehicle includes a generator that generates a flying force and also generates an air flow, a structural component, a microphone that outputs a first signal, a speaker, and a processor. The processor generates a second signal according to the first signal. The structural component surrounds a noise source of the generator, and includes a through-hole extending in a direction of the air flow. The through-hole is in a direction opposite to the direction of the air flow. An end, in the opposite direction, of the structural component corresponds to an end, in the opposite direction, of the noise source of the generator. An end, in the direction of the air flow, of the structural component extends, in the direction of the air flow, beyond an end, in the direction of the air flow, of the noise source of the generator.

11 Claims, 7 Drawing Sheets

(51) Int. Cl.
*G10K 11/178* (2006.01)
*H04R 1/02* (2006.01)
*H04R 3/00* (2006.01)
*H04R 3/12* (2006.01)

(52) U.S. Cl.
CPC ...... *G10K 11/178* (2013.01); *G10K 11/17823* (2018.01); *H04R 1/403* (2013.01); *H04R 1/406* (2013.01); *B64C 2027/003* (2013.01); *B64C 2201/024* (2013.01); *B64C 2201/108* (2013.01); *G10K 2210/1281* (2013.01); *G10K 2210/3044* (2013.01); *G10K 2210/3046* (2013.01); *H04R 1/025* (2013.01); *H04R 3/005* (2013.01); *H04R 3/12* (2013.01); *H04R 2410/05* (2013.01); *H04R 2410/07* (2013.01); *H04R 2499/13* (2013.01)

(58) Field of Classification Search
CPC ............ B64C 39/024; G10K 11/17823; G10K 2210/1281; G10K 2210/3044; G10K 2210/3046; H04R 2410/07

USPC ........................................................ 244/1 N
See application file for complete search history.

(56) References Cited

U.S. PATENT DOCUMENTS

| | | | |
|---|---|---|---|
| 2016/0083073 A1* | 3/2016 | Beckman | G09F 9/33 40/463 |
| 2016/0368597 A1* | 12/2016 | Medlock | B64C 39/024 |
| 2017/0154618 A1* | 6/2017 | Beckman | B64C 39/024 |
| 2017/0159674 A1* | 6/2017 | Maciolek | B64D 33/04 |
| 2017/0369161 A1* | 12/2017 | Alzahrani | B64C 25/32 |
| 2018/0005643 A1* | 1/2018 | Tsingos | G10K 11/175 |
| 2018/0033421 A1* | 2/2018 | Yamagishi | G10K 11/178 |
| 2019/0088244 A1* | 3/2019 | Goto | B64C 39/024 |
| 2019/0130889 A1* | 5/2019 | Matus, Jr. | G10K 11/178 |
| 2019/0185161 A1* | 6/2019 | Eleryan | B64C 29/00 |
| 2020/0189737 A1* | 6/2020 | Lim | B64C 27/20 |

* cited by examiner

UNMANNED AIR VEHICLE

BACKGROUND

1. Technical Field

The present disclosure relates to an unmanned air vehicle.

2. Description of the Related Art

Regarding an unmanned air vehicle, Japanese Unexamined Patent Application Publication No. 2009-57182 discloses an unmanned aircraft having a capability of reducing an influence of a crosswind on an airframe. More specifically, the unmanned aircraft disclosed in Japanese Unexamined Patent Application Publication No. 2009-57182 includes a fuselage along an axis, a propeller fixed to the fuselage and configured to send a wind in a direction parallel to the axis, a steering wing disposed under the lee of the propeller, and a duct. The duct surrounds the propeller and the steering wing such that the propeller and the steering wing are hidden in the duct when seen in a direction perpendicular to the axis.

SUMMARY

In the unmanned aircraft disclosed in Japanese Unexamined Patent Application Publication No. 2009-57182, the existence of the duct causes an increase in weight. This causes an increase in energy spent when the unmanned aircraft flies. Furthermore, the rotation of the propeller or the like generates noise when the unmanned aircraft flies.

One non-limiting and exemplary embodiment provides an unmanned air vehicle capable of reducing noise while suppressing an increase in weight.

In one general aspect, the techniques disclosed herein feature an unmanned air vehicle including: one or more generators, each of which generates a force that drives the unmanned air vehicle to fly and also generates an air flow; one or more first structural components; one or more microphones, each of which outputs a first signal; one or more speakers; and a processor that generates one or more second signals according to the first signal output from each of the one or more microphones. The one or more first structural components respectively correspond to the one or more generators, respectively surround one or more noise sources of the one or more generators, and each includes a through-hole extending in a direction of the air flow generated by a corresponding one of the one or more generators. The through-hole is in a first direction opposite to a second direction of the air flow. An end, in the first direction, of each of the one or more first structural components respectively corresponds to an end, in the first direction, of one of the one or more noise sources of the one or more generators. An end, in the second direction of the air flow, of each of the one or more first structural components respectively extends, in the second direction of the air flow, beyond an end, in the second direction of the air flow, of one of the one or more noise sources of the one or more generators. Each of the one or more microphones is located in an inner region surrounded by a corresponding one of the one or more first structural components such that each of the one or more microphones is spaced apart in the second direction of the air flow from a corresponding one of the one or more generators. Each of the one or more speakers is located apart in the second direction of the air flow from a corresponding one of the one or more generators and outputs a sound according to a corresponding one of the one or more second signals.

The unmanned air vehicle according to the aspect of the present disclosure is capable of reducing noise while suppressing an increase in weight.

General or specific embodiments may be implemented by an apparatus, a system, a method, an integrated circuit, a computer program, a computer-readable storage medium such as a CD-ROM, or any selective combination of an apparatus, a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

In recent years, drones or unmanned air vehicles which are also called unmanned aircrafts or Unmanned Aerial Vehicles (UAVs) have been begun to be used in various fields. For example, it is expected that unmanned air vehicles are useful in various applications such as photographing, delivering of parcels, searching for missing persons, spraying of pesticide, or the like.

However, an unmanned air vehicle makes large noise during flight. For example, a rotation of a propeller disposed on the unmanned air vehicle causes noise to be generated. More specifically, when the propeller rotates, one blade of the propeller generates a blade tip vortex. When this blade tip vortex hits the other blade of the propeller, noise is generated.

The large noise generated by the unmanned air vehicle may limit applications of the unmanned air vehicle. For example, use of an unmanned air vehicle may be limited when it is used in a quiet environment such as hospitals, libraries, or the like or in a quiet time zone such as later night hours. Furthermore, there is a possibility that noise may cause people to have a fear, which may make it difficult for the unmanned air vehicle to fly safely.

In a case where an unmanned air vehicle is large in weight, the large weight makes it difficult for the unmanned air vehicle to smoothly fly, and causes in an increase in energy consumed during flight. It is difficult for the unmanned air vehicle to acquire energy for flight from an external energy source during flight. Thus, the large weight makes it difficult for the unmanned air vehicle to fly for a long time.

In an aspect of the present disclosure, an unmanned air vehicle includes: one or more generators, each of which generates a force that drives the unmanned air vehicle to fly and also generates an air flow; one or more first structural components; one or more microphones, each of which outputs a first signal; one or more speakers; and a processor that generates one or more second signals according to the first signals output from each of the one or more microphones. The one or more first structural components respectively corresponds to the one or more generators, respectively surrounds one or more noise sources of the one or more generators, and each includes a through-hole extending in a direction of the air flow generated by a corresponding one of the one or more generators. The through-hole is in a first direction opposite to a second direction of the air flow. An end, in the first direction, of each of the one or more first structural components respectively corresponds to an end, in the first direction, of one of the one or more noise sources of the one or more generators. An end, in the second direction of the air flow, of each of the one or more first structural components respectively extends, in the second direction of the air flow, beyond an end, in the second direction of the air flow, of one of the one or more noise sources of the one or more generators. Each of the one or more microphones is located in an inner region surrounded by a corresponding one of the one or more first structural components such that each one of the one or more microphones is spaced apart in the second direction of the air flow from a corresponding one of the one or more generators. Each of the one or more speakers is located apart in the second direction of the air flow from a corresponding one of the one or more generators and outputs a sound according to a corresponding one of the one or more second signals.

Thus, it is possible for the unmanned air vehicle to collect a noise that is generated by each generator in the direction of the air flow. In the unmanned air vehicle, the noise collected in the direction of the air flow is sensed by each microphone, and each speaker outputs a sound according to the sensed noise such that the noise is cancelled by the output sound. Therefore, the unmanned air vehicle has an active noise cancelling capability that allows it actively suppress noise by using an opposite-phase sound thereby making it possible to reduce a noise that may occur in the generators.

In the unmanned air vehicle, an upstream part of the air flow is not surrounded by the first structural component, and thus an increase in weight of the unmanned air vehicle is suppressed, and it is possible to effectively reduce the noise that may have a larger influence in the downstream region.

For example, a cross section of each of the one or more first structural components in a direction perpendicular to the second direction of the air flow may increase in size toward the end in the first direction.

Thus, it becomes possible for the unmanned air vehicle to suppress sneaking of noise from the upstream side of the air flow toward the downstream side while properly suppressing an increase in weight. Thus, the unmanned air vehicle is capable of effectively reducing the noise on the downstream side.

For example, one or more second structural components may each be respectively connected, at an end in the first direction, to one of the one or more first structural components such that the one or more first structural components are extended by the one or more second structural components. A cross section of each of the one or more second structural components in the direction perpendicular to the second direction of the air flow may increase in size toward the end, in the first direction, of the one or more second structural components.

Thus, the unmanned air vehicle is capable of properly suppressing sneaking of noise from the upstream side of the air flow toward the downstream side. Thus, the unmanned air vehicle is capable of effectively reducing the noise on the downstream side.

For example, the one or more speakers may output one or more sounds in a direction along the second direction of the air flow.

This makes it possible for the unmanned air vehicle to effectively reduce the noise collected in the direction of the air flow by using the sound output from the speakers in the direction of the air flow.

For example, the processor may generate one or more second signals by using one or more signals representing one or more opposite-phase sounds of the one or more sounds respectively represented by the one or more first signals.

Thus, in the unmanned air vehicle, use of the opposite-phase sound makes it possible to effectively reduce the noise collected in the direction of the air flow.

For example, the second direction may be a downward direction of the unmanned air vehicle when the unmanned air vehicle is flying.

Thus, the unmanned air vehicle is capable of reducing a noise propagating downward when the unmanned air vehicle is flying.

For example, the one or more generators may include two or more generators, the one or more first structural components may include two or more first structural components, the one or more microphones may include two or more microphones, and the one or more speakers may include two or more speakers.

By employing the configuration described above, it becomes possible for the unmanned air vehicle to generate a force that drives the unmanned air vehicle to fly by using the plurality of generators. Furthermore, it becomes possible for the unmanned air vehicle to reduce a noise that may occur in each one of the plurality of generators.

For example, each of the one or more generators may include one or more rotary wings functioning as one of the one or more noise sources.

This makes it possible for the unmanned air vehicle to generate a force that drives the unmanned air vehicle to fly by using the one or more rotary wings. Furthermore, the unmanned air vehicle is capable of properly reducing noise generated by the one or more rotary wings.

For example, a length of each of the one or more first structural components in the second direction of the air flow may correspond to a rotation rate of the one or more rotary wings in a state in which the unmanned air vehicle maintains an altitude.

This makes it possible for the unmanned air vehicle to properly reduce noise generated by the rotary wings.

For example, the one or more speakers may be respectively disposed in the inner region of the one or more first structural components.

This makes it possible for the unmanned air vehicle to effectively reduce the noises that sneak from the inner regions and expand by using the sounds output by the speakers in the inner regions.

For example, each of the one or more generators may include one or more rotary wings, and each of the one or more speakers may be disposed on an extension of a rotation shaft of a corresponding one of the one or more rotary wings.

Thus, in the unmanned air vehicle, by outputting the sounds from the speakers disposed on the extensions of the rotation shafts, it becomes possible for the unmanned air vehicle to effectively reducing the noise radiating around the extension of the rotation shafts.

General or specific embodiments may be implemented by an apparatus, a system, a method, an integrated circuit, a computer program, a computer-readable storage medium such as a CD-ROM, or any selective combination of an apparatus, a system, a method, an integrated circuit, a computer program, and a storage medium.

Embodiments are described in further detail below with reference to drawings. Note that any embodiment described below is provided to illustrate a general or specific example. That is, in the following embodiments of the present disclosure, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent Claims indicating highest-level concepts of the present disclosure are optional.

Note that each drawing used in the following description is a schematic diagram, which does not necessarily provide a strict description of locations or sizes of constituent element.

EMBODIMENTS

Figure 1:
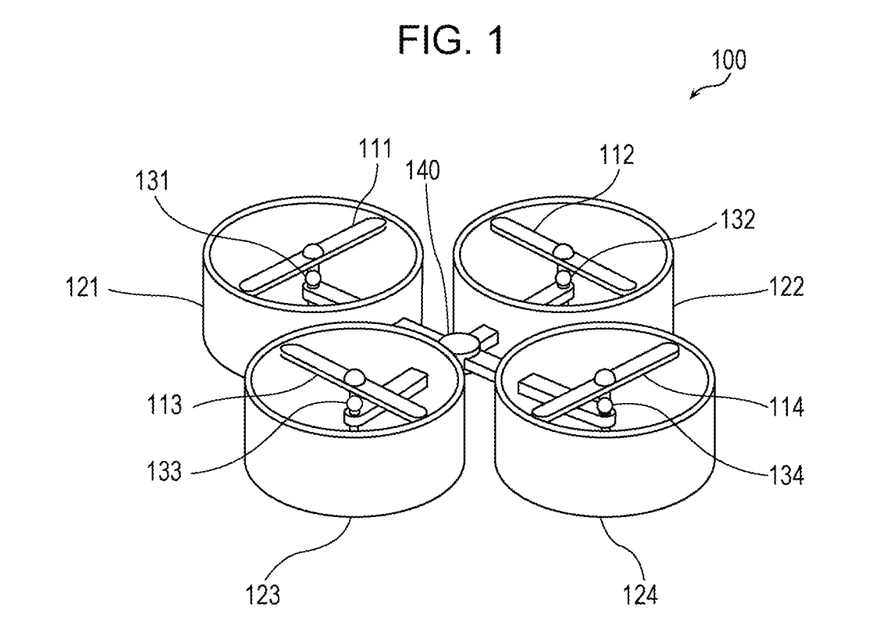
FIG. 1 is an external view illustrating a structure of an unmanned air vehicle according to an embodiment.

FIG. 1 is an external view illustrating a structure of an unmanned air vehicle according to an embodiment. In FIG. 1, the unmanned air vehicle 100 includes generators 111 to 114, structural components (ducts) 121 to 124, microphones 131 to 134, and a housing 140. The unmanned air vehicle 100 may further include an image capturing apparatus.

The generators 111 to 114 generate force to drive the unmanned air vehicle 100 to fly. For example, the generators 111 to 114 each are a machine including a power source, an actuator that generates a flying force using a motive power transmitted from the power source, and other structural components, and more specifically, for example, each generator includes a motor, one or more rotary wings, and a duct or a guard that surrounds the one or more rotary wings. More specifically, the generators 111 to 114 individually generate forces. The force to drive the unmanned air vehicle 100 to fly includes a plurality of forces individually generated by the generators 111 to 114. The force that drives the unmanned air vehicle 100 to fly is also referred to as a resultant force obtained as a result of combining all the plurality of forces individually generated by the respective generators 111 to 114. The force generated individually by each of the generators 111 to 114 may be referred to, for example, as a lift that causes the unmanned air vehicle 100 to move in a vertical direction, that is, to move upward or a thrust that causes the unmanned air vehicle 100 to move in a horizontal direction, that is, to move back and forth and left and right.

The generators 111 to 114 each generate an air flow in a direction opposite to the direction of the force generated by each of the generators 111 to 114. The directions of the forces generated individually may be different among the generators 111 to 114, and thus the directions of the air flows may be different among the generators 111 to 114. The forces generated individually by the generators 111 to 114 may be referred to as components of the force that drives the unmanned air vehicle 100 to fly. That is, the generators 111 to 114 each generate a force component, that drives the unmanned air vehicle 100 to fly, in a direction opposite to the direction of the air flow.

The direction of the air flow is a central direction of the air flow and the air flow generated by the generator moves from the upstream side to the downstream side in the direction of the air flow. For example, when the unmanned air vehicle 100 is flying, the generators 111 to 114 each generate an upward force acting on the unmanned air vehicle 100 and generate an air flow in a downward direction from the unmanned air vehicle 100. The upward direction does not necessarily need to be just upward, and the downward direction does not necessarily need to be just downward.

More specifically, in a case where in the unmanned air vehicle 100, the generators 111 to 114 each include one or more rotary wings, when each rotary wing rotates, a lift is generated in an upward direction, and an air flow is generated in a downward direction. More specifically, the air flow and the force generated by each rotary wing are generated in opposite directions along a rotation shaft of the rotary wing. The lift generated in the upward direction causes the unmanned air vehicle 100 to move upward. In the unmanned air vehicle 100, when at least one of the rotary wings of the generators 111 to 114 is rotated at a rotation rate different from rotation rates of the rotary wings of the other generators, a thrust is generated in one of horizontal directions such as a forward, backward, leftward, or rightward direction. Noise is generated by each rotary wing.

The generators 111 to 114 may also be referred to as force generators, air flow generators, or propellers.

The structural components 121 to 124 are each a structural component having a through-hole, and may also be referred to as a duct. The structural components 121 to 124 each may be made of the same material as a material of one or more other constituent elements or may be made of a different material. For example, the structural components 121 to 124 each may be made of a pure substance or a mixture of two or more substances.

More specifically, a metal, a resin, a wood, or other materials may be employed. A sound insulator, a sound absorbing material, or a combination thereof may be employed.

For example, the structural components 121 to 124 each may be formed in the shape of a cylinder as illustrated in FIG. 1. More specifically, the structural components 121 to 124 each may have the shape of a circular cylinder which is circular in cross section, or a rectangular cylinder which is rectangular in cross section. Alternatively, the shape of the cross section may be a triangle, a hexagon or other shapes. The thickness between the inner and outer wall of each of the structural components 121 to 124 may or may not be constant.

Although in the example illustrated in FIG. 1, the structural components 121 to 124 are the same in shape, the structural components 121 to 124 may be different in shape. Although in the example illustrated in FIG. 1, the structural components 121 to 124 are separated from each other, the structural components 121 to 124 may be integrated into a single piece.

The structural components 121 to 124 respectively correspond to the generators 111 to 114. That is, in each of the structural components 121 to 124, at least one of the generators 111 to 114 is disposed. For example, the structural components 121 to 124 may correspond in a one-to-one fashion to the generators 111 to 114. More specifically, the structural component 121 corresponds to the generator 111, the structural component 122 corresponds to the generator 112, the structural component 123 corresponds to the generator 113, and the structural component 124 corresponds to the generator 114.

The structural component 121 surrounds a noise source of the generator 111 and has a through-hole extending to the direction of the air flow generated by the generator 111 and to the direction opposite to the air flow. The noise source is, for example, one or more rotary wings. Note that the term "noise generator" will also be used to denote the noise source. The hollow of the structural component 121 will also be referred to as a through-hole. In other words, the generator 111 is physically disposed in the through-hole of the structural component 121. The structural component 121 surrounds, via the through-hole, the air flow generated by the generator 111 and also surrounds the generator 111. More specifically, the structural component 121 surrounds a path of the air flow generated by the generator 111 from a plurality of directions perpendicular to the direction of the air flow generated by the generator 111, and the upper end part of the structural component 121 surrounds the generator 111 from a plurality of directions perpendicular to the direction of the air flow.

An end of the structural component 121 as seen in the opposite direction described above corresponds to an end of the noise source of the generator 111 as seen in the opposite direction described above. More specifically, an upper end part of the structural component 121 is an end part of the structural component 121 on the upstream side of the air flow. For example, the upper end part of the structural component 121 includes an end of the structural component 121 on the upstream side of the air flow, and has a width in the direction of the air flow such that the width surrounds the generator 111 from a plurality of directions perpendicular to the direction of the air flow. The end of the structural component 121 on the upstream side of the air flow may also be referred to as the upper end of the structural component 121 or the upper end of the upper end part of the structural component 121.

The path of the air flow is a path along the direction of the air flow generated by the generator 111. The plurality of directions perpendicular to the direction of the air flow are, for example, all directions perpendicular to the air flow. That is, the structural component 121 cylindrically surrounds the path of the air flow, and the upper end part of the structural component 121 fully surrounds the generator 111 including the one or more rotary wings from the plurality of directions perpendicular to the air flow. For example, the end, in the opposite direction, of the one or more rotary wings is at a location corresponding to the end, in the opposite direction, of the structural component 121 such that the rotary wings are located inside the structural components 121. That is, the whole side of the generator 111 is surrounded by the upper end part of the structural component 121. Note that elements of the generator 111 that generate no noise when the unmanned air vehicle is flying do not necessarily need to be surrounded by the structural component 121. For example, elements such as a shaft for fixing the rotary wing of the generator 111 may include a part extending in the opposite direction beyond the end, in the opposite direction, of the structural component 121.

The end, in the direction of the air flow, of the structural component 121 extends further in the direction of the air flow beyond a position corresponding to the end, in the direction of the air flow, of the noise source of the generator 111. More specifically, the through-hole of the structural component 121 has a size for accommodating the generator 111, and the length of the through-hole of the structural component 121 as seen in the direction of the air flow is greater than the length of the upper end part. For example, the through-hole may have a length ⅓ to twice the width of the through-hole. Note that the range of the length described above is merely an example, and the length of the through-hole is not limited to this range. Also note that the length of the through-hole is a length of the through-hole as measured in the direction of the air flow, and the width of the through-hole is a width of the through-hole as measured in the direction perpendicular to the direction of the air flow.

Similarly, the structural component 122 surrounds a path of the air flow generated by the generator 112 from a plurality of directions perpendicular to the direction of the air flow generated by the generator 112, and the upper end part of the structural component 122 surrounds the generator 112 from a plurality of directions perpendicular to the direction of the air flow. Similarly, the structural component 123 surrounds the generator 113 and a path of the air flow generated by the generator 113, and the structural component 124 surrounds the generator 114 and a path of the air flow generated by the generator 114.

The microphones 131 to 134 each are an apparatus that acquires a sound, converts the acquired sound to a signal, and outputs the signal. That is, the microphones 131 to 134 each sense a sound and output a signal representing the sensed sound.

The microphones 131 to 134 respectively correspond to the generators 111 to 114. That is, the microphones 131 to 134 are each assigned to at least one of the generators 111 to 114. For example, the microphones 131 to 134 may correspond, in a one-to-one manner, to the generators 111 to 114. More specifically, in the present example, the microphone 131 corresponds to the generator 111, the microphone 132 corresponds to the generator 112, the microphone 133 corresponds to the generator 113, and the microphone 134 corresponds to the generator 114.

The microphone 131 is disposed so as to correspond to the generator 111, the microphone 132 is disposed so as to correspond to the generator 112, the microphone 133 is disposed so as to correspond to the generator 113, and the microphone 134 is disposed so as to correspond to the generator 114.

Mores specifically, the microphone 131 is disposed in an inner region surrounded by the structural component 121 corresponding to the generator 111 such that the microphone 131 is apart in the downstream direction of the air flow from the generator 111. The inner region surrounded by the structural component 121 may also be referred to as the through-hole of the structural component 121. In the present example, the microphone 131 is disposed by way of example in the center of the inner region. Alternatively, the microphone 131 may be disposed on a surface of an inner wall of the structural component 121.

Similarly, the microphone 132 is disposed in an inner region surrounded by the structural component 122 corresponding to the generator 112 such that the microphone 132 is apart in the downstream direction of the air flow from the generator 112. The microphones 133 and 134 are disposed in a similar manner.

The housing 140 is a structural component for physically accommodating a processor, a memory, and the like. For example, the generators 111 to 114, the structural components 121 to 124, the microphones 131 to 134, and the housing 140 are connected together via one or more support structures such that relative positions thereof are maintained by the one or more support structures.

Figure 2:
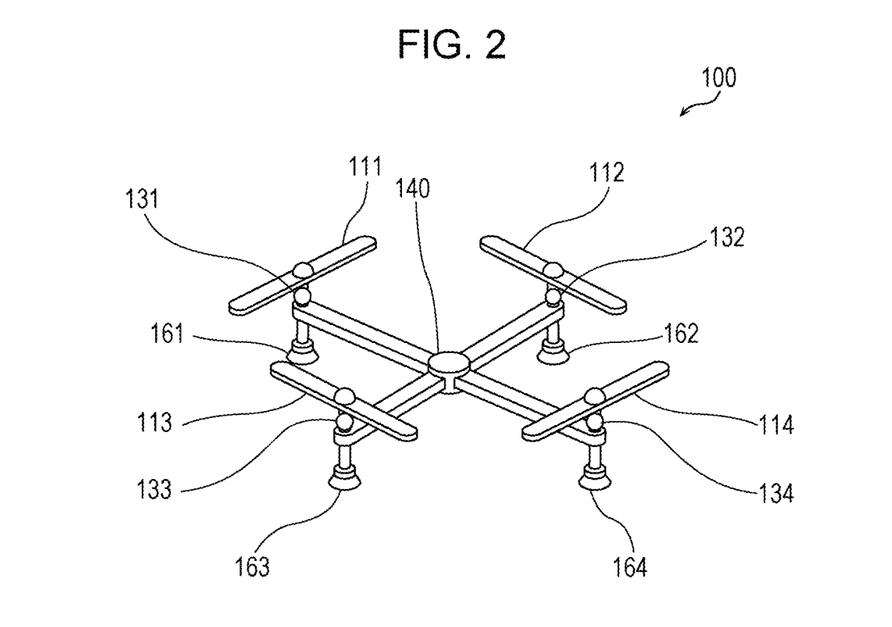
FIG. 2 is a conceptual diagram illustrating a structure of an unmanned air vehicle in a state in which a structural component is removed, according to an embodiment.

FIG. 2 is a conceptual diagram illustrating a structure of the unmanned air vehicle 100 in a state in which the structural components 121 to 124 illustrated in FIG. 1 are removed. The unmanned air vehicle 100 further includes speakers 161 to 164. The speakers 161 to 164 are connected to the housing 140 via one or more support structures such that the speakers 161 to 164 are physically supported by the one or more support structures. For example, the speakers 161 to 164 are respectively disposed on extensions of the rotation shafts of the rotary wings of the generators 111 to 114. For example, the speakers 161 to 164 may be disposed on rotation support shafts of the rotary wings of the respective generators 111 to 114 such that each speaker is located at the middle of the shaft, or the speakers 161 to 164 may be supported by other support elements at lower locations on extensions of the rotation support shafts.

The speakers 161 to 164 each are an apparatus that acquires a signal, converts the acquired signal to a sound, and outputs the sound. That is, the speakers 161 to 164 respectively output sounds represented by the acquired signals.

The speakers 161 to 164 respectively correspond to the generators 111 to 114. That is, each of the speakers 161 to 164 is assigned to at least one of the generators 111 to 114. For example, the speakers 161 to 164 correspond in a one-to-one manner to the generators 111 to 114. In the present example, the speaker 161 corresponds to the generator 111, the speaker 162 corresponds to the generator 112, the speaker 163 corresponds to the generator 113, and the speaker 164 corresponds to the generator 114.

The speaker 161 is disposed so as to correspond to the generator 111, the speaker 162 is disposed so as to correspond to the generator 112, the speaker 163 is disposed so as to correspond to the generator 113, and the speaker 164 is disposed so as to correspond to the generator 114.

More specifically, the speaker 161 is disposed in the inner region surrounded by the structural component 121 corresponding to the generator 111 such that the speaker 161 is apart in the direction of the air flow from the generator 111. More specifically, the speaker 161 is disposed more downstream in the air flow from the generator 111 than the location of the microphone 131 corresponding to the generator 111. Similarly, the speaker 162 is disposed more downstream in the air flow from the generator 112 than the location of the microphone 132 corresponding to the generator 112. The speakers 163 and 164 are respectively disposed similarly so as to correspond to the generators 113 and the generator 114. Note that the speaker 161 may be disposed, in the air flow generated by the generator 111, at a location upstream from the microphone 131 corresponding to the generator 111 as long as the speaker 161 is located downstream in the air flow from the generator 111. In this case, the microphone 131 is used not as a noise microphone but as an error microphone.

For example, the speaker 161 outputs the sound in the same direction as the direction of the air flow generated by the generator 111. Note that the speaker 161 basically has a directivity and the output direction of the sound is defined in a direction in which the output sound has a large strength. The speaker 161 is disposed such that the sound output direction is coincident with the direction of the air flow. Similarly, the speaker 162 outputs the sound in the same direction as the direction of the air flow generated by the generator 112. Similarly, the speakers 163 and 164 each output the sound in the same direction as the direction of the air flow.

The speakers 161 to 164 may or may not be surrounded by the structural component 121 to 124 from a plurality of directions perpendicular to the direction of the air flow. For example, the speaker 161 may be located in the inner region surrounded by the structural component 121 or may be located in another region. Alternatively, the speaker 161 may be disposed on the surface of the inner wall of the structural component 121.

Figure 3:
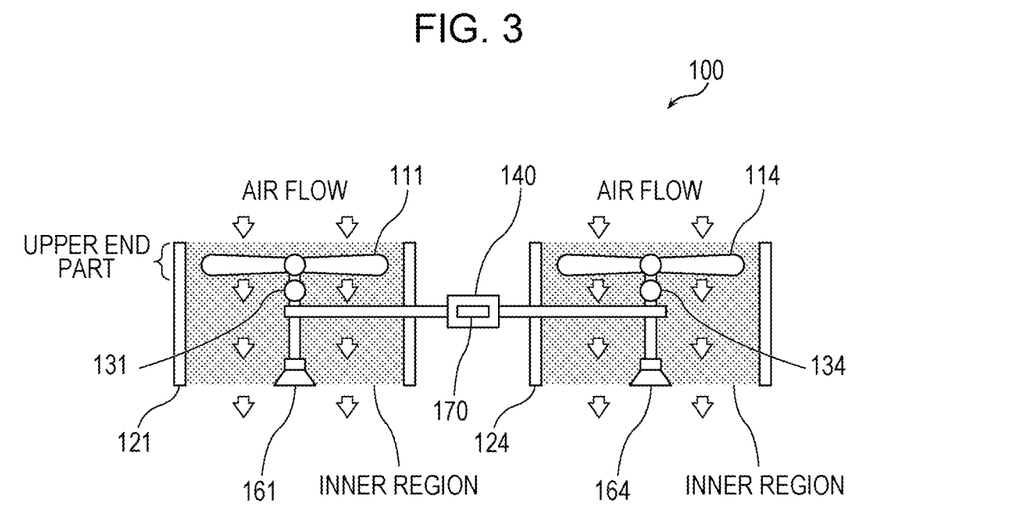
FIG. 3 is a cross-sectional view illustrating a structure of an unmanned air vehicle according to an embodiment.

FIG. 3 is a cross-sectional view illustrating a structural component of the unmanned air vehicle 100 illustrated in FIG. 1. More specifically, FIG. 3 conceptually illustrates cross sections taken vertically across the generators 111 and 114 of the unmanned air vehicle 100 illustrated in FIG. 1. Cross sections of the generators 112 and 113 are basically similar to those of the generators 111 and 114 although the cross sections of the generators 112 and 113 are not illustrated. As illustrated in FIG. 3, a processor 170 is accommodated in the housing 140. That is, the unmanned air vehicle 100 further includes the processor 170.

The processor 170 is an electronic circuit that performs information processing. Mores specifically, the processor 170 generates second signals according to the first signals respectively output from the microphones 131 to 134.

For example, the processor 170 acquires the first signals output from the respective microphones 131 to 134 via wired or wireless communication. A communication line for wired communication may be included in the one or more support structures that support the housing 140 and the like.

According to the first signals acquired from the respective microphones 131 to 134, the processor 170 generates second signals representing opposite-phase sounds of the sounds represented by the first signals. For example, the opposite-phase sound of the original sound is a sound with a phase opposite to the phase of the original sound and has a waveform that is an inversion of a waveform of the original sound.

The processor 170 outputs the second signals to the respective speakers 161 to 164. For example, the processor 170 outputs the second signals by transmitting the second signals to the respective speakers 161 to 164 via wired or wireless communication.

In this process, more specifically, according to the first signal acquired from the microphone 131, the processor 170 generates the second signal representing the sound having the phase opposite to the phase of the sound represented by the first signal, and the processor 170 outputs the second signal to the speaker 161. Similarly, according to the first signal acquired from the microphone 132, the processor 170 generates the second signal representing the sound having the phase opposite to the phase of the sound represented by the first signal, and the processor 170 outputs the second signal to the speaker 162.

Similarly, the processor 170 outputs, to the speaker 163, the second signal generated according to the first signal acquired from the microphone 133, and the processor 170 outputs, to the speaker 164, the second signal generated according to the first signal acquired from the microphone 134.

The speakers 161 to 164 output sounds represented by the respective second signals.

For example, the speaker 161 outputs the sound according to the second signal generated according to the first signal output from the microphone 131. Similarly, the speaker 162 outputs the sound according to the second signal generated according to the first signal output from the microphone 132. Similarly, the speaker 163 outputs the sound according to the second signal generated according to the first signal output from the microphone 133, and the speaker 164 outputs the sound according to the second signal generated according to the first signal output from the microphone 134.

Thus, the opposite-phase sound of the original sound input to the microphone 131 is output from the speaker 161. Similarly, the opposite-phase sound of the original sound input to the microphone 132 is output from the speaker 162. Similarly, the opposite-phase sound of the original sound input to the microphone 133 is output from the speaker 163, and the opposite-phase sound of the original sound input to the microphone 134 is output from the speaker 164. As a result, the noises generated by the generators 111 to 114 are reduced.

More specifically, the noise generated by the generator 111 is sensed by the microphone 131, and the opposite-phase sound of the noise is output from the speaker 161. This makes it possible for the unmanned air vehicle 100 to cancel the noise generated by the generator 111 by the opposite-shape sound output from the speaker 161.

The technique of actively suppressing the noise by the opposite-phase sound in the above-described manner is also called active noise cancelling (ANC). The first signal is also called a reference signal, and the second signal is also called a control signal.

The structural component 121 causes the noise generated by the generator 111 to be collected in the direction of the air flow. The microphone 131 disposed in the inner region surrounded by the structural component 121 is located apart from the generator 111 in the downstream direction of the air flow. Thus, the microphone 131 is capable of properly sensing the noise collected in the direction of the air flow.

The speaker 161 is capable of properly cancelling the noise by outputting, in the direction of the air flow, the opposite-phase sound of the noise collected in the direction of the direction. That is, the speaker 161 outputs the opposite-phase sound of the noise such that the opposite-phase sound of the noise propagates in the same direction as the direction in which the noise propagates thereby properly canceling the noise.

Basically, to make it possible for the unmanned air vehicle 100 to fly, the generator 111 generates the force in the upward direction of the unmanned air vehicle 100 and generates the air flow in the downward direction of the unmanned air vehicle 100. When the unmanned air vehicle 100 is flying, it is very likely that the influence of the noise is more significant on a region below the unmanned air vehicle 100 than is on a region above the unmanned air vehicle 100. That is, it is very likely that the influence of the noise is more significant on a downstream region of the unmanned air vehicle 100 than is on an upstream region of the unmanned air vehicle 100. The speaker 161 is capable of canceling the noise having the significant influence by canceling the noise in the downstream region of the air flow.

The upper end part of the structural component 121 surrounds the generator 111. That is, the upstream region of the air flow above the generator 111 is not surrounded, which allows it to suppress an increase in weight.

The noise generated by the generator 111 has been described above. Noises generated by the generators 112 to 114 are also handled in a similar manner.

The unmanned air vehicle 100 may include a communication apparatus, and the processor 170 may wirelessly communicate with an external apparatus located outside the unmanned air vehicle 100 via the communication apparatus. The processor 170 may receive an operation signal issued to the unmanned air vehicle 100 via the communication apparatus. The processor 170 may control the unmanned air vehicle 100 to fly by operating the generators 112 to 114 and the like according to the operation signal.

The processor 170 may be accommodated in a constituent element different from the housing 140. For example, the processor 170 may be accommodated in one of the structural components 121 to 124, the microphones 131 to 134, or the speakers 161 to 164. The unmanned air vehicle 100 may not include the housing 140.

In the example described above, the speakers 161 to 164 output sounds according to the respective second signals generated based on the first signals. Alternatively, the processor 170 may generate one second signal using at least two of the first signals respectively acquired from the microphones 131 to 134, and the speakers 161 to 164 each may output a sound according to the one second signals.

Figure 4:
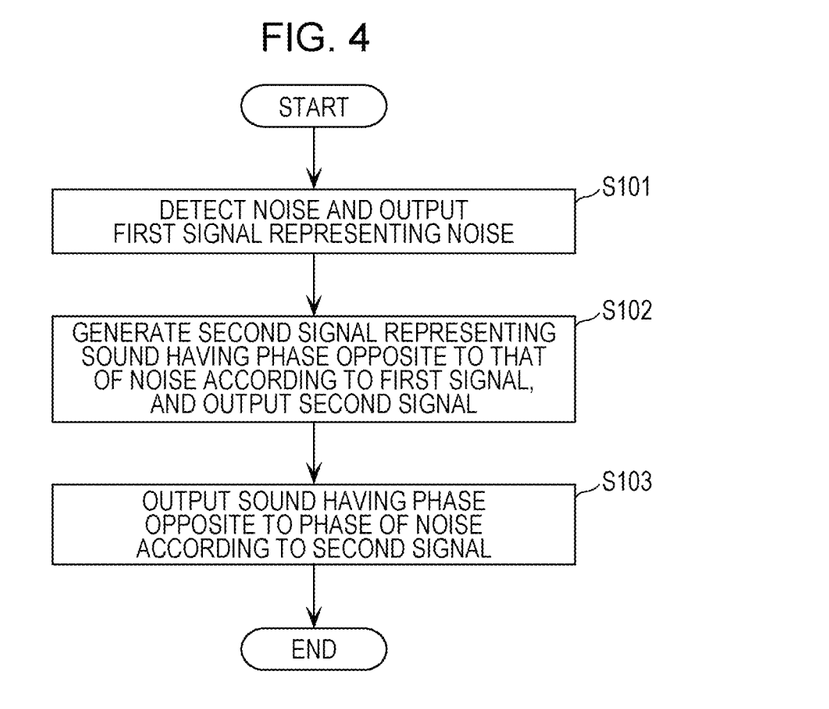
FIG. 4 is a flow chart illustrating an operation of an unmanned air vehicle according to an embodiment.

FIG. 4 is a flow chart illustrating an operation of the unmanned air vehicle 100 illustrated in FIG. 1. The operation illustrated in FIG. 4 is accomplished by a plurality of constituent elements of the unmanned air vehicle 100.

First, each of the microphones 131 to 134 of the unmanned air vehicle 100 senses noise and outputs the first signal representing the noise (S101). The processor 170 acquires the first signals output from the respective microphones 131 to 134. For example, the microphones 131 to 134 respectively transmit the first signals to the processor 170 thereby outputting the first signals, and the processor 170 receives the first signals output from the respective microphones 131 to 134 thereby acquiring the first signals.

Next, according to the first signals output from the respective microphones 131 to 134, the processor 170 of the unmanned air vehicle 100 generates the second signals representing the opposite-phase sounds of the noises represented by the first signals, and the processor 170 outputs the resultant second signals (S102). The speakers 161 to 164 acquire the second signals from the processor 170.

For example, the processor 170 transmitting the second signals to the respective speakers 161 to 164 thereby outputting the second signals. The speakers 161 to 164 respectively receive the second signals from the processor 170 thereby acquiring the second signals.

More specifically, the processor 170 transmits, to the speaker 161, the second signal generated according to the first signal acquired from the microphone 131. The processor 170 transmits, to the speaker 162, the second signal generated according to the first signal acquired from the microphone 132. The processor 170 transmits, to the speaker 163, the second signal generated according to the first signal acquired from the microphone 133. The processor 170 transmits, to the speaker 164, the second signal generated according to the first signal acquired from the microphone 134.

The speaker 161 receives, from the processor 170, the second signal generated according to the first signal acquired from the microphone 131. The speaker 162 receives, from the processor 170, the second signal generated according to the first signal acquired from the microphone 132. The speaker 163 receives, from the processor 170, the second signal generated according to the first signal acquired from the microphone 133. The speaker 164 receives, from the processor 170, the second signal generated according to the first signal acquired from the microphone 134.

Next, each of the speakers 161 to 164 of the unmanned air vehicle 100 outputs the opposite-phase sound of the noise according to the corresponding one of the second signal (S103). That is, the speakers 161 to 164 respectively output opposite-phase sounds represented by the second signals. For example, according to the second signals received from the processor 170, the speakers 161 to 164 output the opposite-phase sounds respectively represented by the second signals.

Thus, it becomes possible for the unmanned air vehicle 100 to reduce the noises generated by the generators 111 to 114.

In the example described above with reference to FIG. 1 and other figures, each of the four generators 111 to 114 is realized using one rotary wing including one rotation plane and one rotation shaft. However, one generator may include a plurality of rotary wings. The plurality of rotary wings may have different rotation planes different from each other and may have axes different from each other. In the description given above, it is assumed by way of example that the total length of one rotary wing is defined by the diameter of the rotation plane. Alternatively, the number of rotary wings may be defined such that there are two rotary wings each of which extends along a radius of the rotation plane.

The rotary wing includes one or more wings, and rotating thereof generates a force in a direction along the rotation shaft and generates a stream of an air flow in a direction opposite to the direction of the force. The rotary wing is also called a blade, a rotor, or a propeller. The one or more rotary wings may also be called a rotary wing set.

Each of the generators 111 to 114 may not be realized by one or more rotary wings, but each of the generators 111 to 114 may be a jet engine, a rocket engine, or the like.

In the example described above, the unmanned air vehicle 100 includes the four generators 111 to 114. However, the unmanned air vehicle 100 may include three or less generator or may include five or more generators. Similarly, although the unmanned air vehicle 100 includes the four structural components 121 to 124 in the example described above, the unmanned air vehicle 100 may include three or less structural components or may include five or more structural components.

Similarly, although the unmanned air vehicle 100 includes the four microphones 131 to 134 in the example described above, the unmanned air vehicle 100 may include three or less microphones or may include five or more microphones. Similarly, although the unmanned air vehicle 100 includes the four speakers 161 to 164 in the example described above, the unmanned air vehicle 100 may include three or less speakers or may include five or more speakers.

The processor 170 may include a plurality of sub-processors. That is, the processor 170 may be realized by the plurality of sub-processors. The processor 170 may be a multiprocessor.

The unmanned air vehicle 100 may include an antenna for use in wireless communication. The unmanned air vehicle 100 may include a wireless communication circuit, or the processor 170 may also operate as a wireless communication circuit for wireless communication. The unmanned air vehicle 100 may include an energy source such as a power supply for operating various constituent elements, or the unmanned air vehicle 100 may be connected to an external power supply.

The direction of the sound generated by each of the speakers 161 to 164 does not necessary need to be coincident with the direction of the air flow. That is, each of the speakers 161 to 164 may output a sound toward a direction different from the direction of the air flow such that the noise is reduced in the direction in which the sound is output. Diffusion of the output sound can cause the noise to be reduced also in the direction of the air flow. A nondirectional or omnidirectional speaker may be employed as the speaker 161, and the speaker 161 may be disposed in a downstream region of the air flow in the structural component 121.

In the example described above, the unmanned air vehicle 100 includes the four structural components 121 to 124 corresponding in a one-to-one manner to the four generators 111 to 114. Alternatively, the unmanned air vehicle 100 may include one structural component corresponding to a plurality of generators. The unmanned air vehicle 100 may include one structural component, one microphone, and one speaker, corresponding to a plurality of generators. The unmanned air vehicle 100 may include a plurality of microphones and a plurality of speakers corresponding to each generator or each structural component. For example, the plurality of microphones and the plurality of speakers may be disposed at locations surrounding an air flow.

The operation of the unmanned air vehicle 100 is not limited to an operation of outputting an opposite-phase sound of noise according to the noise, but the unmanned air vehicle 100 may output a sound depending on noise so as to mask the noise. For example, the unmanned air vehicle 100 may output a sound such as a music sound or the like with a sound volume similar to the sound volume of the noise.

The unmanned air vehicle 100 may not be symmetric in structure. Similarly, an unmanned air vehicle according to any one of modifications described below does not necessarily need to be symmetric in structure.

Some modifications to the embodiment are described below. In the following description of those modifications, a description of substantially similar elements to those in the embodiment may be omitted.

First Modification

In the embodiment described above, the unmanned air vehicle 100 includes the four generators 111 to 114, the four structural components 121 to 124, the four microphones 131 to 134, and the four speakers 161 to 164. In contrast, in a first modification described below, an unmanned air vehicle includes one generator, one structural component, one microphone, and one speaker.

Figure 5:
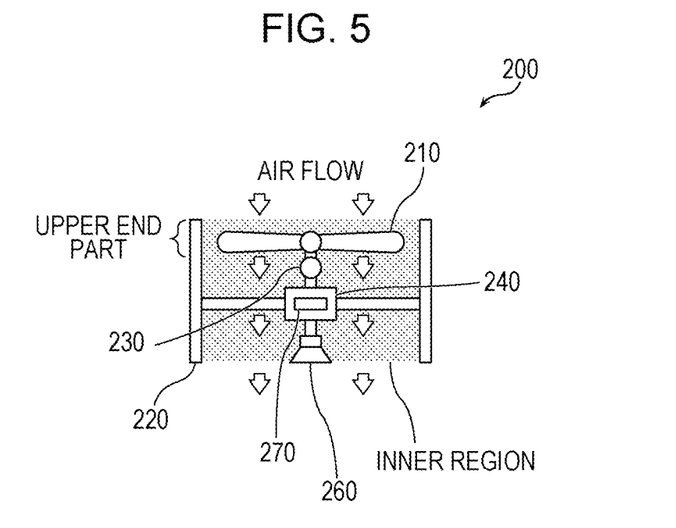
FIG. 5 is a cross-sectional view illustrating a structure of an unmanned air vehicle according to a first modification.

FIG. 5 is a cross-sectional view illustrating a structure of the unmanned air vehicle according to the first modification. In FIG. 5, the unmanned air vehicle 200 includes a generator 210, a structural component 220, a microphone 230, a housing 240, a speaker 260, and a processor 270.

In the present modification, each constituent element of the plurality of constituent elements of the unmanned air vehicle 200 corresponds to at least one constituent element of the plurality of constituent elements of the unmanned air vehicle 100 according to the embodiment described above. Basically, each constituent element of the plurality of constituent elements of the unmanned air vehicle 200 has the same feature as that of the at least one constituent element of the plurality of constituent elements of the unmanned air vehicle 100.

More specifically, the generator 210 corresponds to the generators 111 to 114, the structural component 220 corresponds to the structural components 121 to 124, the microphone 230 corresponds to the microphones 131 to 134, and the speaker 260 corresponds to the speakers 161 to 164. The housing 240 and the processor 270 respectively correspond to the housing 140 and the processor 170.

In the embodiment described above, the unmanned air vehicle 100 includes the four generators 111 to 114. In contrast, in the present modification, the unmanned air vehicle 200 includes the one generator 210. In the present modification, the air flow of the generator 210 is surrounded by the structural component 220. In the inner region surrounded by the structural component 220, there are disposed the generator 210, the microphone 230, the housing 240, the speaker 260, and the processor 270. The processor 270 performs control such that an opposite-phase sound of a sound sensed by the microphone 230 is output from the speaker 260.

This configuration according to the present modification makes it possible for the unmanned air vehicle 200 to properly reduce the noise that may occur by the generator 210. That is, the unmanned air vehicle 200 capable of properly reduce the noise includes the one generator 210, the one structural component 220, the one microphone 230, the one housing 240, the one speaker 260, and the one processor 270.

In the embodiment described above, each of the generators 111 to 114 of the unmanned air vehicle 100 generate a force component to drive the unmanned air vehicle 100 to fly. The generator 210 of the unmanned air vehicle 200 according to the present modification also generate a force component to drive the unmanned air vehicle 200 to fly. However, this force component can be regarded as the force itself that drives the unmanned air vehicle 200 to fly.

Second Modification

In a second modification described below, a structural component (duct) of an unmanned air vehicle has a form different from the form of each of the structural components (ducts) 121 to 124 of the unmanned air vehicle 100 according to the embodiment described above.

Figure 6:
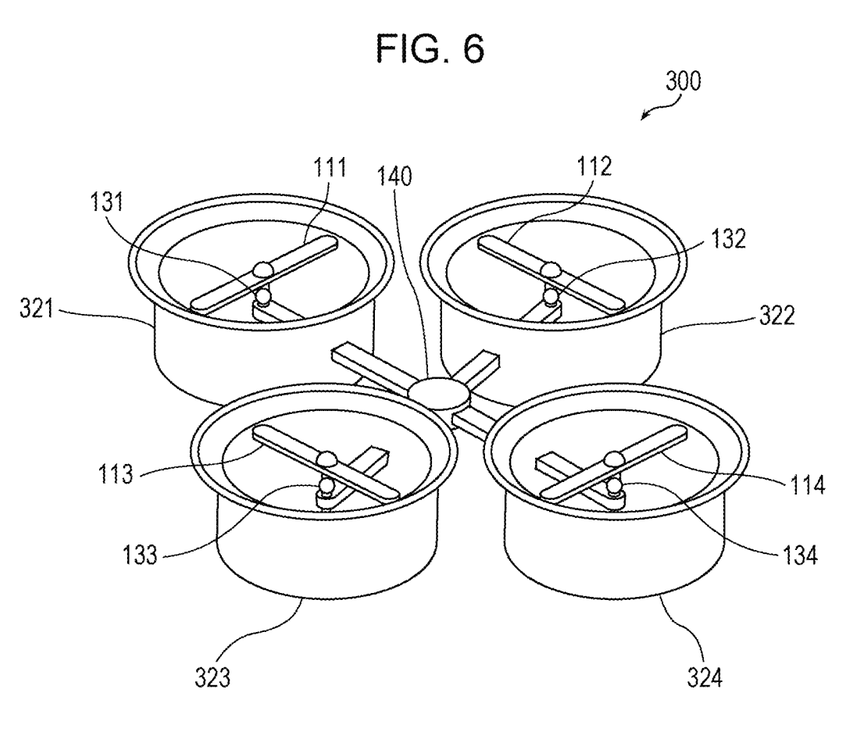
FIG. 6 is an external view illustrating a structure of an unmanned air vehicle according to a second modification.

FIG. 6 is an external view illustrating a structure of the unmanned air vehicle according to the second modification. In the present modification, the unmanned air vehicle 300 includes, as with the unmanned air vehicle 100 according to the embodiment described above, generators 111 to 114, microphones 131 to 134, a housing 140, speakers 161 to 164, and a processor 170. The unmanned air vehicle 300 further includes structural components 321 to 324 corresponding to the structural components 121 to 124 of the unmanned air vehicle 100.

The structural components 321 to 324 of the unmanned air vehicle 300 are basically similar to the structural components 121 to 124 of the unmanned air vehicle 100 except that there is a difference in form.

Figure 7:
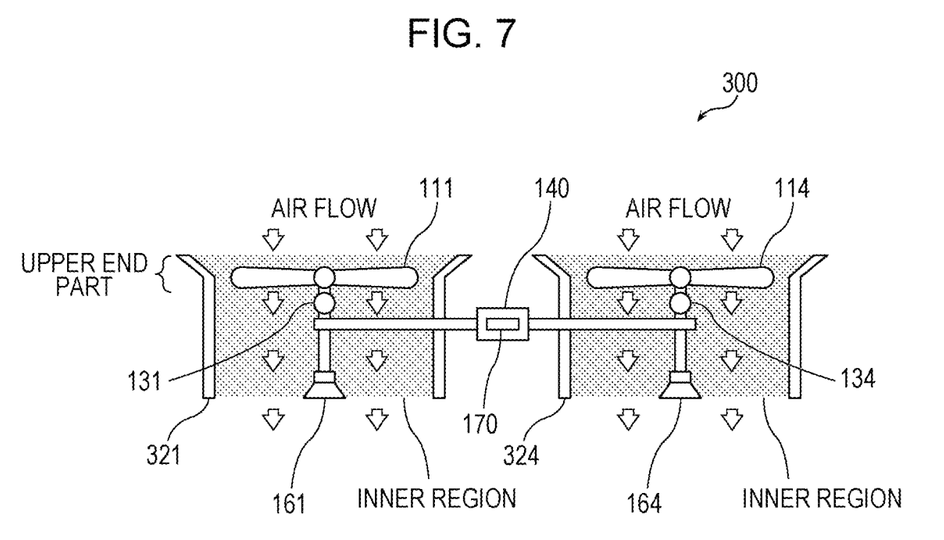
FIG. 7 is a cross-sectional view illustrating a structure of an unmanned air vehicle according to the second modification.

FIG. 7 is a cross-sectional view illustrating a structure of the unmanned air vehicle 300 illustrated in FIG. 6. More specifically, FIG. 7 conceptually illustrates cross sections taken vertically across the generators 111 and 114 of the unmanned air vehicle 300 illustrated in FIG. 6. Cross sections of the generators 112 and 113 are basically similar to those of the generators 111 and 114 although the cross sections of the generators 112 and 113 are not illustrated.

A cross section taken along a direction perpendicular to the direction of the air flow in each of the structural components 321 to 324 increases in size as the location of the cross section is closer to an end, in a direction opposite to the direction of air flow, of each of the structural components 321 to 324. That is, for example, the upper end part of the structural component 321 illustrated in FIG. 7 has a different form from the form of the upper end part of the structural component 121 illustrated in FIG. 3. More specifically, the cross section of the upper end part of the structural component 321 in the upstream region of the air flow expands outward with the location toward the upper end of the structural component 321. That is, the cross section taken in a direction perpendicular to the direction of the air flow in the region surrounded by the upper end part of the structural component 321 increases in size with the location of the cross section toward the upper end of the upper end part of the structural component 321. Note that the upper end of the upper end part of the structural component 321 is an end of the upper end part of the structural component 321 in the upstream direction of the air flow.

A region surrounded by the upper end part of the structural component 321 is a part of an inner region surrounded by the structural component 321. The region surrounded by the upper end part of the structural component 321 is not limited to the region surrounded by the whole upper end part of the structural component 321 but may be a region surrounded by part of the upper end part of the structural component 321. The region surrounded by part of the upper end part of the structural component 321 may be a region surrounded by such a part that is included in the upper end part and is located at an upstream side of a plane intersecting the center of the generator 111 and perpendicular to the direction of the air flow.

The above-described form of the upper end part causes the noise generated in an upstream region by the generator 111 to radiate in the upstream direction, and thus it becomes possible to suppress propagating of the sound generated on the upstream side toward the downstream side.

Similarly, the upper end part of each of the structural components 322 to 324 expands outward with position. This suppress propagating of noise generated on the upstream side of each one of the generators 112 to 114 toward the downstream side.

Note that in the first modification, the upper end part of the structural component 220 in the upstream region of the air flow may expand outwards as with the upper end part of each of the structural components 321 to 324 according to the second modification.

In the example described above, the upper end part of the structural component expands outward. Alternatively, the structural component may expand outward along the whole length of the structural component. More specifically, for example, the structural component may be tapered along the whole length of the structural component in the direction of the air flow.

Another structural component may be connected to the above-described structural component. More specifically, for example, the unmanned air vehicle 300 may further include one or more second structural components connected, at the ends in the opposite direction, to the respective structural components 321 to 324 such that the structural components 321 to 324 are extended by the second structural components. A cross section of each of the one or more second structural components taken in a direction perpendicular to the direction of the air flow increases in size toward the end of the one or more second structural components as seen in the opposite direction. This configuration makes it possible to more securely suppress leaking of sound generated by the generators to the outside of the structural components.

Figure 8:
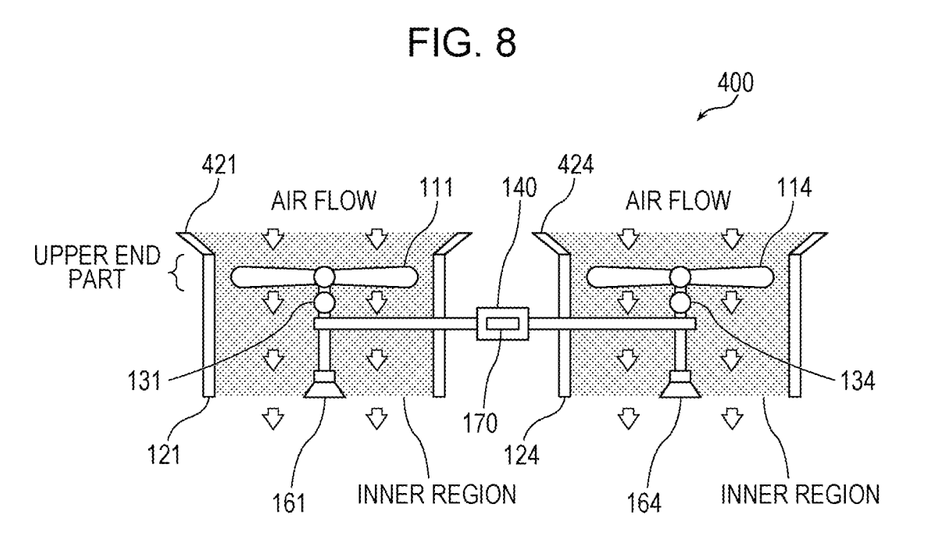
FIG. 8 is a cross-sectional view illustrating another structure of an unmanned air vehicle according to the second modification.

Each second structural component described above may be connected to each one of the structural components 121 to 124 of the unmanned air vehicle 100 according to the first embodiment described above. FIG. 8 illustrates an example of a result of this configuration. The unmanned air vehicle 400 illustrated in FIG. 8 includes a second structural component 421 connected to the structural component 121 and a second structural component 424 connected to the structural component 124. The unmanned air vehicle 400 also includes second structural components connected, in a similar manner, to the structural components 122 and 123, respectively.

A structural component similar to the second structural component described above may be connected to the structural component 220 according to the first modification, or to each of the structural components 321 to 324 according to the second modification.

Third Modification

In a third modification described below, the length of a structural component (duct) of an unmanned air vehicle is determined depending on a particular rotation rate of a rotary wing of a generator. More specifically, the length of one or more structural components as seen in the direction of the air flow has a value determined depending on the rotation rate of one or more rotary wing in a state in which the unmanned air vehicle maintains its altitude.

For example, a fundamental frequency of noise generated by the rotary wing is determined from the number of wings and the rotation rate of the rotary wing. More specifically, the fundamental frequency f (Hz), the rotation rate r (rpm) of the rotary wing, and the number of wings n have a relationship represented by a mathematical expression: $f=r/60*n$. A direction in which noise has a relatively high sound pressure varies depending on the fundamental frequency f. For example, as the fundamental frequency f increases, the direction in which the sound pressure is relatively high moves toward the rotation plane of the rotary wing. On the other hand, as the fundamental frequency f decreases, the direction in which the sound pressure is relatively high moves in a direction away from the rotation plane of the rotary wing.

Figure 9:
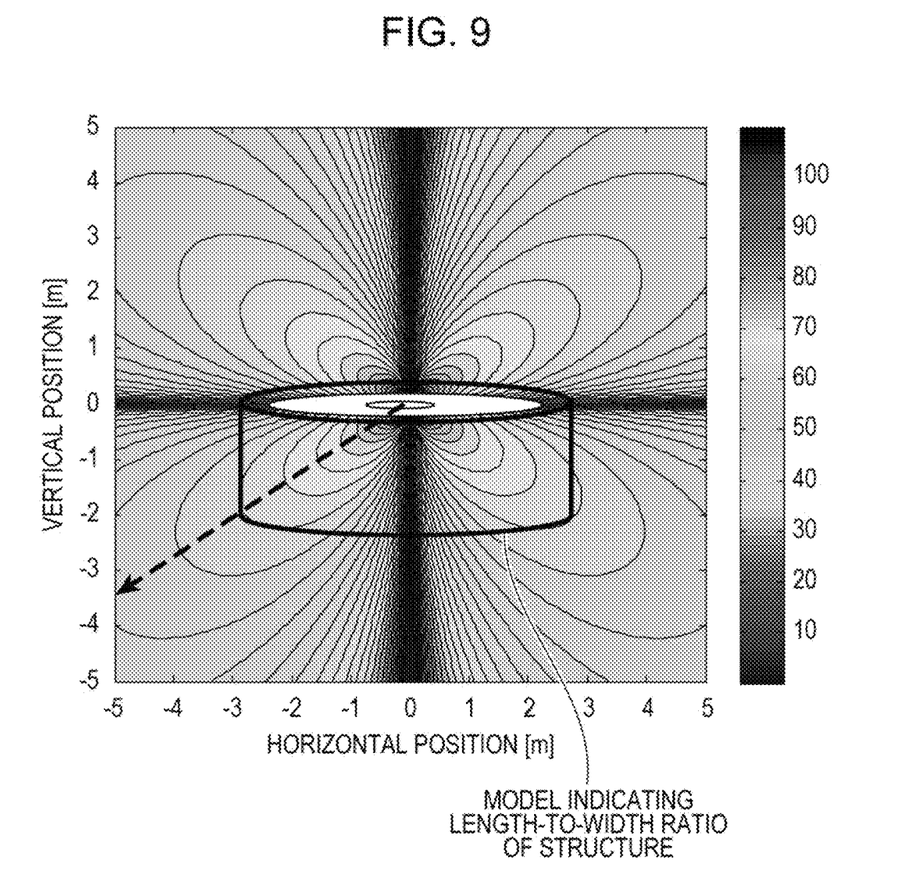
FIG. 9 is a distribution diagram illustrating a first pattern of a sound pressure distribution according to a third modification.
Figure 10:
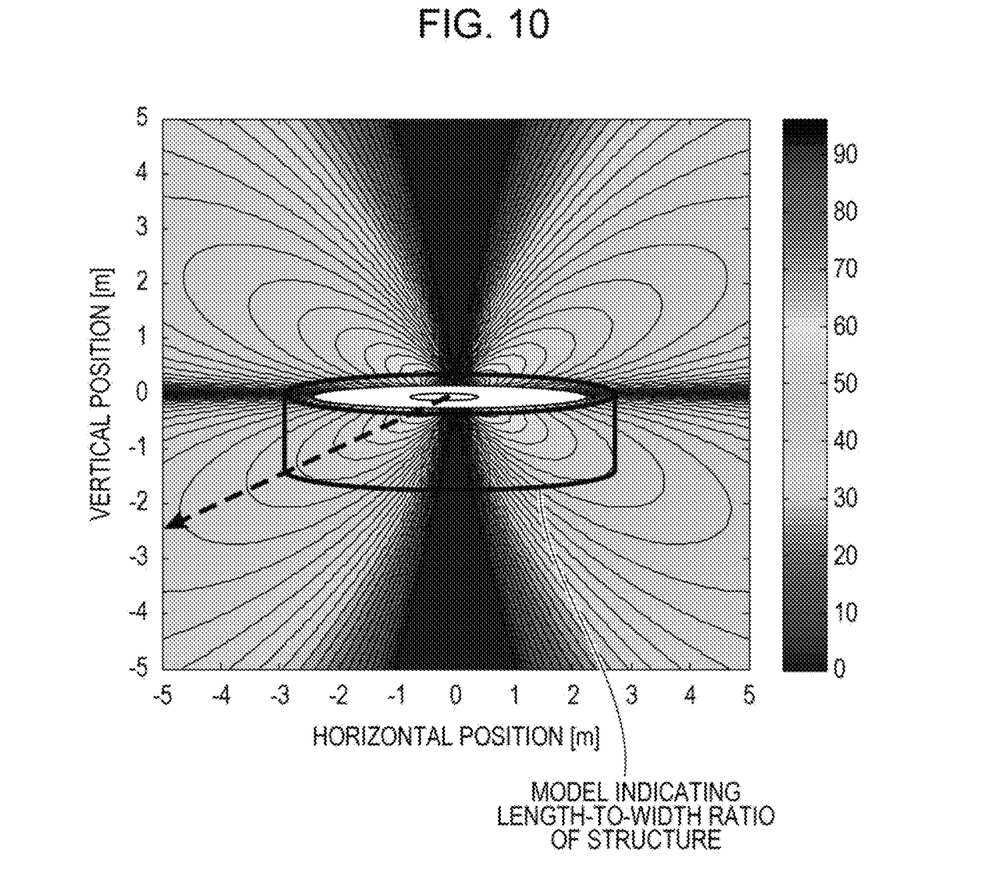
FIG. 10 is a distribution diagram illustrating a second pattern of a sound pressure distribution according to the third modification.
Figure 11:
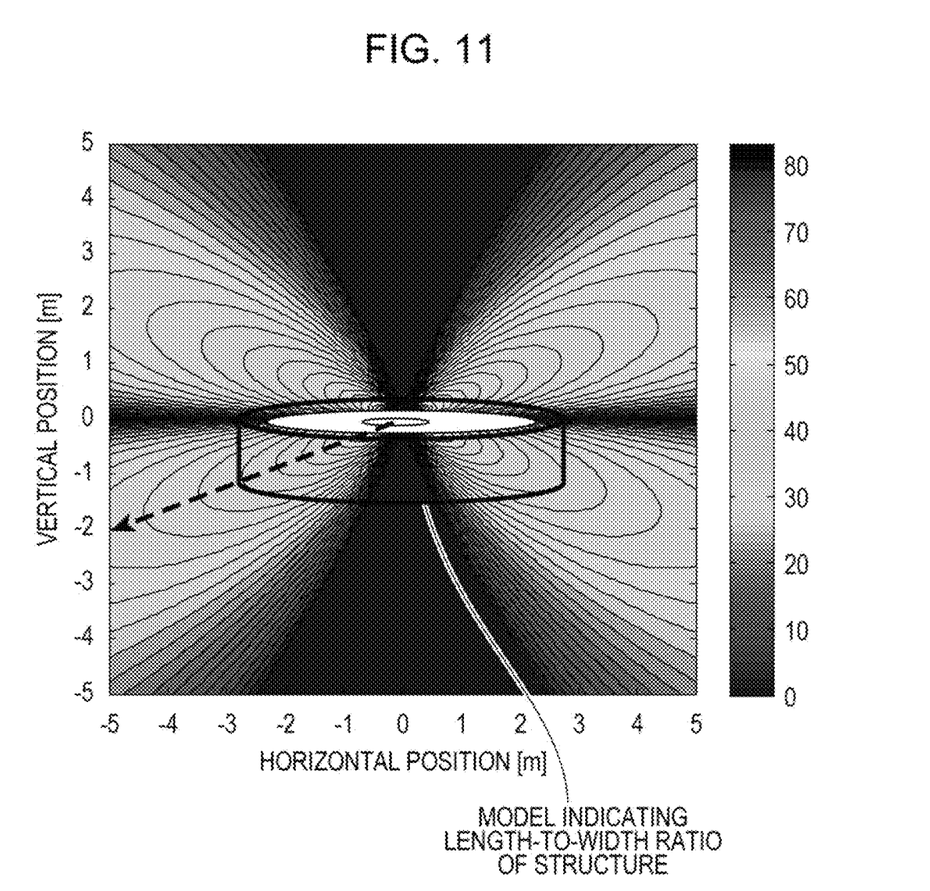
FIG. 11 is a distribution diagram illustrating a third pattern of a sound pressure distribution according to the third modification.

In FIGS. 9 to 11, sound pressure distributions of noise are shown for three different cases. The fundamental frequency f increases in order from FIG. 9, FIG. 10, and FIG. 11. As the fundamental frequency f increases, the sound pressure distribution is confined within a smaller spread angle. In other words, as the fundamental frequency f increases, a direction represented by a broken line in which the sound pressure is relatively high moves toward the rotation plane of the rotary wing, and the length of the structural component in the direction of the air flow decreases. More specifically, a side wall of the structural component is formed such that the side wall intersects the direction represented by the broken line in which the sound pressure is relatively high.

The length of the side wall of the structural component is determined so as to cover the direction in which the sound pressure is relatively high when the sound pressure is calculated for the fundamental frequency f given by a frequency that is assumed to occur for the unmanned air vehicle. For example, the frequency assumed for the unmanned air vehicle is a frequency that will occur when a flying altitude is maintained, a frequency that occurs most frequently during the flight, or the like. The frequency may be calculated based on a lowest rotation rate that allows it to maintain a flying altitude or a rotation rate that occurs most frequently during the flight and also based on the number of wings.

Thus, in the unmanned air vehicle, the length of the structural component is determined to a value that is proper to suppress noise. This prevents, in the unmanned air vehicle, the structural component from having an excessive weight and prevents the noise from being insufficiently suppressed.

In each of FIGS. 9 to 11, a model of a structural component is represented by a length-to-width ratio, and an actual size thereof is not shown. For example, the actual size of the structural component may be ⅕₀ to ⅟₁₀ times the size shown in each of FIGS. 9 to 11. The above-described length and the width of the structural component may be a length and a width of a through-hole of the structural component. The present modification may be applied to the unmanned air vehicle 100 according to the embodiment, the unmanned air vehicle 200 according to the first modification, or the unmanned air vehicle 300 according to the second modification.

The unmanned air vehicle has been described above with reference to various embodiments and modifications. However, the unmanned air vehicle is not limited to those embodiments and modifications. It will be apparent to those skilled in the art that many various modifications may be applicable to the embodiments. Furthermore, constituent elements of embodiments may be arbitrarily combined.

For example, a process executed by a particular constituent element in the embodiments or modifications described above may be executed by another constituent element. The processing order may be changed among a plurality of processes. A plurality of processes may be executed in parallel.

Ordinal numbers such as first, second, and so on used in the explanations may be properly changed. An ordinal number may be newly assigned to a constituent element, or an ordinal number assigned to a particular constituent element may be deleted.

The structural components each may be made of each may be made of a pure substance or a mixture of two or more substances. More specifically, a metal, a resin, a wood, or other materials may be employed. The location of each constituent element may be defined by a location of the center of the constituent element or by a principal location of the constituent element.

The upstream direction corresponds to the direction opposite to the direction of the air flow, and the downstream direction corresponds to the direction of the air flow. For example, in a case where the direction of the air flow is downward, the upstream direction is upward, and the downstream direction is downward.

Although each speaker is disposed in an inner region of a structural component in the embodiment described above, the speaker may be disposed outside the structural component. For example, the speaker may be disposed on a side wall of the structural component or on an end in the direction in which the air flow is generated by the generator. Alternatively, the speaker may be disposed at another position in the inside of the structural component. For example, the microphone may be disposed on a surface of an inner wall of the structural component.

A basic configuration of an unmanned air vehicle according to an aspect of the present disclosure, and typical modifications are described below. These may be combined or may be combined with some of the embodiments and the modifications described above.

(1) In an aspect of the present disclosure, an unmanned air vehicle (100, 200, 300, 400) includes one or more generators (111 to 114, 210), one or more first structural components (121 to 124, 220, 321 to 324), one or more microphones (131 to 134, 230), one or more speakers (161 to 164, 260), and a processor (170, 270).

The one or more generators (111 to 114, 210) each generate a force that drives the unmanned air vehicle to fly and generate an air flow. The processor (170, 270) generates second signals according to first signals respectively output from the one or more microphones.

The first structural components (121 to 124, 220, 321 to 324) corresponding to the respective generators respectively surround noise sources of the generators, and each first structural component has a through-hole extending in a direction of an air flow generated by a corresponding one of the generator and in a direction opposite to the direction of the air flow. An end of each first structural component in the opposite direction corresponds to an end of the noise source of each generator in the opposite direction. An end of each first structural component in the direction of the air flow extends further in the direction of the air flow beyond a position corresponding to an end, as seen in the direction of the air flow, of the corresponding one of the generators surrounded by the first structural component.

Each microphone (131 to 134, 230) is located in a corresponding one of inner regions surrounded by the respective first structural components such that the location of each microphone is apart from the corresponding one of generator in the direction of the air flow. Each speaker (161 to 164, 260) is located apart from the corresponding one of the generators in the direction of the air flow and outputs a sound according to the one of second signals.

The configuration described above makes it possible for the unmanned air vehicle (100, 200, 300, 400) to collect a noise that may be generated by each generator in the direction of the air flow. In the unmanned air vehicle (100, 200, 300, 400), the noise collected in the direction of the air flow is sensed by each microphone. In the unmanned air vehicle (100, 200, 300, 400), each speaker outputs a sound according to the sensed noise.

Thus, the unmanned air vehicle (100, 200, 300, 400) has an active noise cancelling capability that allows it actively suppress noise by using an opposite-phase sound thereby making it possible to reduce a noise that may occur in the generators.

Furthermore, in the unmanned air vehicle (100, 200, 300, 400), the upstream part of the air flow is not surrounded by the first structural component, and thus an increase in weight of the unmanned air vehicle is suppressed, and it is possible to effectively reduce the noise in the downstream region on which the noise has a large influence.

(2) For example, in the unmanned air vehicle (300), the size of the cross section of each first structural component taken in a direction perpendicular to the direction of the air flow may increase toward the end in the opposite direction. This makes it possible for the unmanned air vehicle (300) to suppress sneaking of noise from the upstream side of the air flow toward the downstream side while properly suppressing an increase in weight. Thus, the unmanned air vehicle (300) is capable of effectively reducing the noise on the downstream side.

(3) For example, the unmanned air vehicle (400) may further include one or more second structural components (421, 424) connected, at the ends in the opposite direction, to the respective first structural components (121 to 124) such that the first structural components are extended by the second structural components. A cross section of each one of the one or more second structural components (421, 424) taken in a direction perpendicular to the direction of the air flow may increase in size toward the end, in the opposite direction, of the one of the one or more second structural components (421, 424).

Thus, the unmanned air vehicle (400) is capable of properly suppressing sneaking of noise from the upstream side of the air flow toward the downstream side. Thus, the unmanned air vehicle is capable of effectively reducing the noise on the downstream side.

(4) For example, in the unmanned air vehicle (100, 200, 300, 400), the one or more speakers (161 to 164, 260) may output sounds in a direction along the direction of the air flow. This makes it possible for the unmanned air vehicle (100, 200, 300, 400) to effectively reduce direction the noise collected in the direction of the air flow by using the sound output from the speakers in the direction of the air flow.

(5) For example, in the unmanned air vehicle (100, 200, 300, 400), the processor (170, 270) may generate second signals by using signals representing opposite-phase sounds of the sounds represented by the respective first signals. Thus, in the unmanned air vehicle (100, 200, 300, 400), use of the opposite-phase sound makes it possible to effectively reduce the noise collected in the direction of the air flow.

(6) For example, in the unmanned air vehicle (100, 200, 300, 400), each one of the one or more generators (111 to 114, 210) may output an air flow in a direction apart downward from the unmanned air vehicle when the unmanned air vehicle is flying. Thus, the unmanned air vehicle (100, 200, 300, 400) is capable of reducing a noise propagating downward when the unmanned air vehicle is flying.

(7) For example, in the unmanned air vehicle (100, 300, 400), the one or more generators (111 to 114) may be two or more generators. The one or more first structural components (121 to 124, 321 to 324) may be two or more first structural components. The one or more microphones (131 to 134) may be two or more microphones. The one or more speakers (161 to 164) may be two or more speakers.

Each generator (111 to 114) may generate a force component, that drives the unmanned air vehicle to fly, in a direction opposite to the direction of the air flow generated by the generator.

By employing the configuration described above, it becomes possible for the unmanned air vehicle (100, 300, 400) to generate a force that drives the unmanned air vehicle to fly by using the plurality of generators. Furthermore, it becomes possible for the unmanned air vehicle (100, 300, 400) to reduce a noise that may occur in each one of the plurality of generators.

(8) For example, in the unmanned air vehicle (100, 200, 300, 400), the one or more generators (111 to 114, 210) each may include one or more rotary wings functioning as the noise source. This makes it possible for the unmanned air vehicle (100, 200, 300, 400) to generate a force that drives the unmanned air vehicle to fly by using the one or more rotary wings. Furthermore, the unmanned air vehicle (100,

200, 300, 400) is capable of properly reducing noise generated by the one or more rotary wings.

(9) For example, in the unmanned air vehicle (100, 200, 300, 400), the length of each one of the one or more first structural components as seen in the direction of the air flow has a value corresponding to a rotation rate of one or more rotary wings in a state in which the unmanned air vehicle maintains an altitude.

This makes it possible for the unmanned air vehicle (100, 200, 300, 400) to properly reduce noise generated by the rotary wings.

(10) For example, in the unmanned air vehicle (100, 200, 300, 400), the speakers (161 to 164, 260) may be disposed in the respective one or more inner regions. In the unmanned air vehicle (100, 200, 300, 400) configured in this manner, by outputting sounds from the speakers in the inner regions, it is possible to effectively reduce noise leaking and radiating from the inner regions.

(11) For example, in the unmanned air vehicle (100, 200, 300, 400), each one of the one or more generators (111 to 114, 210) may include one or more rotary wings. Each speaker (161 to 164, 260) may be disposed on an extension of the rotation shaft of the one or more rotary wings. Thus, in the unmanned air vehicle (100, 200, 300, 400), by outputting the sounds from the speakers disposed on the extension of the rotation shaft, it becomes possible for the unmanned air vehicle to effectively reducing the noise radiating from the extension of the rotation shaft.

The present disclosure is applicable to reducing noise of an unmanned air vehicle and reducing weight of an unmanned air vehicle and thus applicable to an unmanned air vehicle for use in flying in a quiet environment.

What is claimed is:

1. An unmanned air vehicle, comprising:
    one or more generators, each of which generates a force that drives the unmanned air vehicle to fly and also generates an air flow;
    one or more first structural components;
    one or more microphones, each of which outputs a first signal;
    one or more speakers; and
    a processor that generates one or more second signals according to the first signal output from each of the one or more microphones,
    wherein the one or more first structural components respectively correspond to the one or more generators, respectively surround one or more rotary wings of the one or more generators, and each includes a through-hole extending in a direction of the air flow generated by a corresponding one of the one or more generators, the through-hole being in a first direction opposite to a second direction of the air flow,
    a first end, in the first direction, of the one or more first structural components and a first surface of a rotation plane, in the first direction, of the one or more rotary wings are aligned such that the one or more rotary wings are covered by a first end part of the one or more first structural components, the first end part corresponding to a position of the one or more rotary wings,
    a second end, in the second direction of the air flow, of the one or more first structural components is extended, in the second direction of the air flow, beyond a second surface of the rotation plane, in the second direction of the air flow, of the one or more rotary wings by a length longer than the first end part,
    each of the one or more microphones is located in an inner region surrounded by a corresponding one of the one or more first structural components such that each of the one or more microphones is spaced apart in the second direction of the air flow from a corresponding one of the one or more generators, and
    each of the one or more speakers is located apart in the second direction of the air flow from a corresponding one of the one or more generators and outputs a sound according to a corresponding one of the one or more second signals.

2. The unmanned air vehicle according to claim 1, wherein a cross section of each of the one or more first structural components in a direction perpendicular to the second direction of the air flow increases in size toward the first end in the first direction.

3. The unmanned air vehicle according to claim 1, further comprising:
    one or more second structural components, each of which is respectively connected, at the first end in the first direction, to the one or more first structural components such that the one or more first structural components are extended by the one or more second structural components, and
    a cross section of each of the one or more second structural components in a direction perpendicular to the second direction of the air flow increases in size, in the first direction.

4. The unmanned air vehicle according to claim 1, wherein the one or more speakers output one or more sounds in a third direction along the second direction of the air flow.

5. The unmanned air vehicle according to claim 1, wherein the processor generates one or more second signals by using one or more signals representing one or more opposite-phase sounds of one or more sounds respectively represented by the first signal output from each of the one or more microphones.

6. The unmanned air vehicle according to claim 1, wherein the second direction is a downward direction of the unmanned air vehicle when the unmanned air vehicle is flying.

7. The unmanned air vehicle according to claim 1, wherein
    the one or more generators include two or more generators,
    the one or more first structural components include two or more first structural components,
    the one or more microphones include two or more microphones, and
    the one or more speakers include two or more speakers.

8. The unmanned air vehicle according to claim 1, wherein a length of each of the one or more first structural components in the second direction of the air flow corresponds to a rotation rate of the one or more rotary wings in a state in which the unmanned air vehicle maintains an altitude.

9. The unmanned air vehicle according to claim 1, wherein the one or more speakers are respectively disposed in the inner region surrounded by the one or more first structural components.

10. The unmanned air vehicle according to claim 9, wherein
    each of the one or more speakers is disposed on an extension of a rotation shaft of a corresponding one of the one or more rotary wings.

11. The unmanned air vehicle according to claim 1, wherein each of the one or more speakers is disposed on a rotation support shaft of a corresponding one of the one or more generators.

* * * * *